United States Patent [19]
Stout

[11] 3,914,611
[45] Oct. 21, 1975

[54] GAMMA CAMERA
[75] Inventor: Karl J. Stout, Hudson, Mass.
[73] Assignee: Raytheon Company, Lexington, Mass.
[22] Filed: Nov. 21, 1973
[21] Appl. No.: 418,157

[52] U.S. Cl. .................................. 250/369; 250/366
[51] Int. Cl. .............................................. G01t 1/20
[58] Field of Search ............................ 250/366, 369

[56] References Cited
UNITED STATES PATENTS

| | | | |
|---|---|---|---|
| 3,573,458 | 4/1971 | Anger | 250/369 |
| 3,732,419 | 5/1973 | Kulberg et al. | 250/366 |
| 3,777,146 | 12/1973 | Brunnett et al. | 250/369 |

*Primary Examiner*—Archie R. Borchelt
*Attorney, Agent, or Firm*—David M. Warren; Joseph D. Pannone; Milton D. Bartlett

[57] ABSTRACT

A gamma camera with a plurality of photomultipliers arranged for locating flashes of light produced by a scintillator in response to incident radiation. Individual pulse shaping circuits are utilized for forming pulses in accordance with the energy received by each photomultiplier. The pulse signals obtained for each of the photomultipliers are combined to provide X and Y coordinate location signals, such ones of the pulse signals as having predetermined amplitudes being selected for display.

7 Claims, 5 Drawing Figures

| TERMINALS | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| X COMBINER | NC | 12 + | 6 + | 12 + | 12 − | 6 − | 12 − | 6 + | 4 + | 3 + | 4 + | 6 + | NC | 6 − | 4 − | 3 − | 4 − | 6 − | NC |
| Y COMBINER | NC | 12 + | NC | 12 − | 12 − | NC | 12 + | 6 + | 12 + | NC | 12 − | 6 − | 6 − | 6 − | 12 − | NC | 12 + | 6 + | 6 + |
| Z COMBINER | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − |
| E COMBINER | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − |

FIG. 5

GAMMA CAMERA

BACKGROUND OF THE INVENTION

Cameras utilized in providing an image of a radioactive source are frequently composed of a scintillator crystal and a collimator for guiding radiant energy from the source to the scintillator crystal. An array of photomultipliers is positioned on the opposite side of the scintillator crystal for receiving flashes of light emitted by the crystal in response to the incident radiant energy. Typically, the measure of light energy received by each photomultiplier is obtained by integrating circuits coupled to each of the photomultipliers, the relative magnitudes of these energies serving to indicate the location of each of the light flashes on the crystal. The stored energy of each of the photomultipliers is converted to a signal suitable for combining with the signals obtained from the energies of the other photomultipliers. In particular, it is noted that a highly active source of high energy radiation rapidly illuminates the scintillator crystal with successive photons of high radiant energy such as the energy of x-rays or gamma rays. Such rapid illumination is useful in obtaining high resolution images of the source, provided that the electronic circuitry utilized in forming pulse signals from the energy obtained from the photomultipliers is capable of operating at a rate commensurate with the rate at which high energy photons are incident upon the scintillator crystal.

A problem arises because of the need for integrating the light energy from the flashes of light obtained in response to each high energy photon, and because of the need for forming a suitable signal from the integrated energy to permit a combination of these signals for locating the positions of these light flashes. These integration requirements and signal forming requirements have not permitted the best resolution to be obtained for the higher rates at which the high energy photons are incident upon the scintillator crystal.

SUMMARY OF THE INVENTION

The foregoing problems are overcome and other aspects of the invention are provided by a gamma camera incorporating an electronic system in accordance with the invention wherein each photomultiplier is provided with its own integrator and pulse shaping circuit. Each pulse shaping circuit employs a subtraction circuit which forms the difference between the waveform of the voltage appearing across the integrator and a delayed replica thereof, the pulse shaping circuit further comprising a base line restoring circuit to ensure that the value of successive pulse signals are independent of the values of preceding pulse signals. Such ones of these pulses which exceed a threshold are combined in a pair of summing circuits through scaling resistors of suitable values in accordance with the geometry of the array of the photomultipliers to provide X and Y coordinate values of the positions of successive incidences of gamma ray photons. The signals of the pulse shaping circuits are further combined to provide a measure of the total energy of the incident gamma ray photons, each of these measures being applied to a pulse height analyzer circuit which is utilized for operating a sampling circuit to sample only such ones of the X and Y coordinate signals as result from gamma photons of suitable energy. The sampled signals are scaled in accordance with the magnitudes of the energies received by the photomultipliers whereupon the coordinate signals are applied to a display for presenting an image of the radioactive source.

BRIEF DESCRIPTION OF THE DRAWINGS

The aforementioned features and other advantages of the invention are explained in the following description taken in connection with the accompanying drawings wherein.

DESCRIPTION OF THE PREFERRED EMBODIMENT

Figure 1:
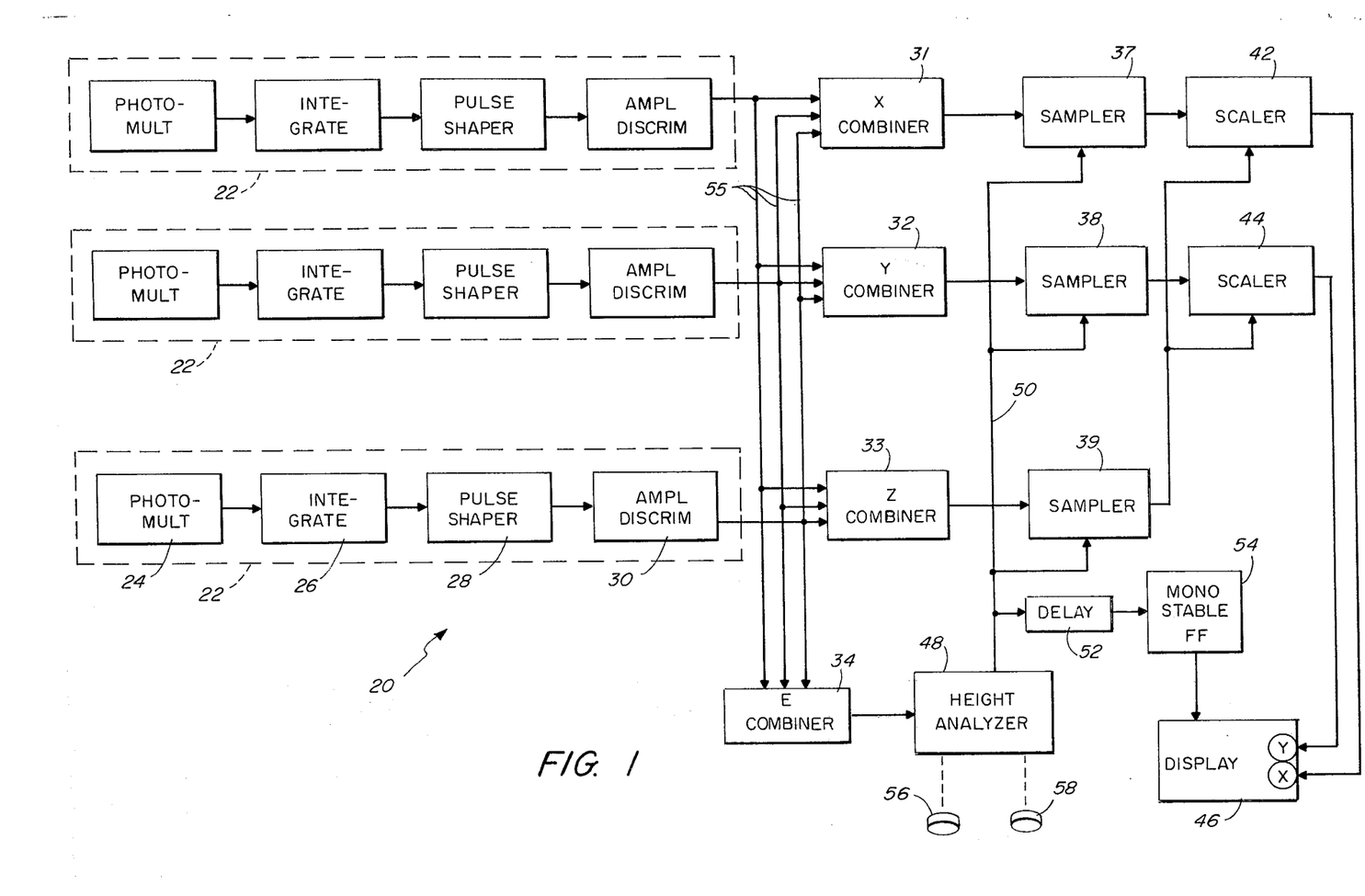
FIG. 1 is a block diagram of the camera system in accordance with the invention.

Referring now to FIG. 1, there is shown a block diagram of the electrical portion of a camera system 20 which comprises a plurality of channels 22, each channel 22 comprising a photomultiplier 24, an integrator 26, a pulse shaper 28 and a discriminator 30 of the amplitudes of signals provided by the pulse shaper 28. Each of the channels 22 is coupled to four combiners 31–34, the combiners 31–33 being coupled respectively to samplers 37–39. Output signals of the samplers 37 and 38 are scaled by scalers 42 and 44 and are applied respectively to the X and Y terminals of a display 46. The output of the combiner 34 is coupled to an analyzer 48 which analyzes the pulse height of signals from the combiner 34, the output of the analyzer 48 being applied along line 50 to trigger the samplers 37–39 as well as being coupled via a delay unit 52 for triggering a monostable flip-flop 54. The flip-flop 54 provides a gate to the display 46 for illuminating the display 46 after the signals in the samplers 37–38 have been scaled by the scalers 42 and 44.

In operation, the electrical portion of the camera system 20 provides for an image on the display 46 related to the signals provided by the photomultipliers 24 in each of the channels 22 in the following manner. In each channel 22, the photomultiplier 24 provides a series of pulse signals corresponding to individual flashes of light incident upon the photomultiplier 24, a series of these flashes of light being produced in response to a single gamma ray photon or x-ray photon impinging upon a scintillator crystal, to be described with reference to FIG. 2, which is placed in front of the photomultipliers 24. The series of the light flashes represent the energy transferred from the gamma ray photon to the scintillator crystal and, accordingly, the signals provided by the photomultiplier 24 in response to each of the light flashes are summed together by means of the integrator 26 to provide a measure of the energy of a gamma ray photon or x-ray photon impinging upon the scintillator crystal.

The pulse shaper 28 receives a signal voltage from the integrator 26 and converts it into a pulse having a duration very much shorter than the integration time of the integrator 26, and having an amplitude proportional to the peak voltagel of the signal voltage of the integrator 26. The waveform of the pulses of the pulse shapers 28 in each of the channels 22 are suitable for being arithmetically combined for providing information with respect to the position of an impact of a gamma ray photon upon the scintillator crystal. The discriminator 30 includes a base line restoring circuit, as will be described in FIG. 3, for further correcting the waveform of the signal provided by the pulse shaper 28 to ensure that successive pulses of the pulse shaper 28 have amplitudes independent of amplitude of preceding ones of these pulses. In addition, each discriminator is provided with a threshold to discriminate between pulses having a relatively small amplitude, smaller than that of the threshold voltage, while permitting those pulses having an amplitude larger than the threshold voltage to be passed onto the combiners 31-34.

Figure 2:
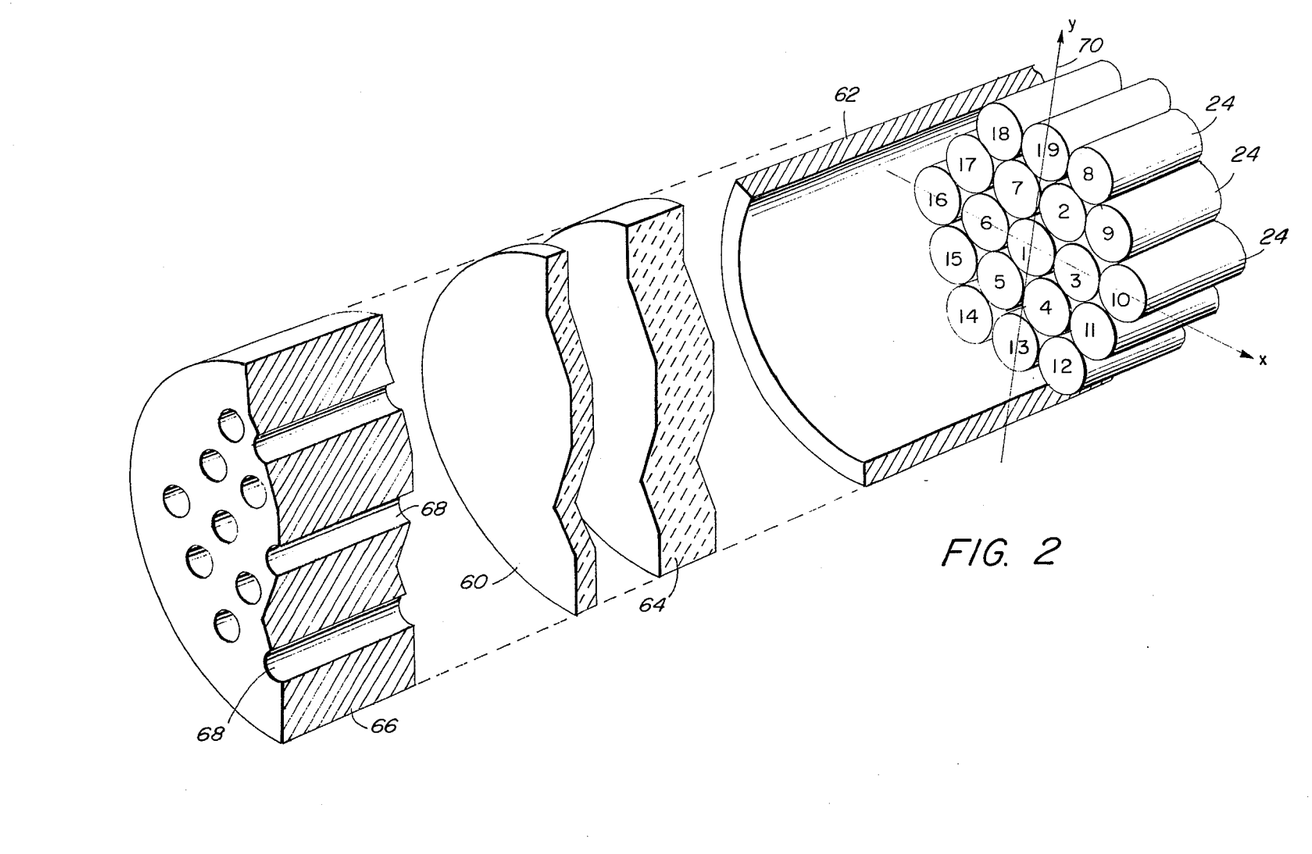
FIG. 2 is an exploded view of an assembly of the photomultipliers referred to in FIG. 1 showing the position of the photomultipliers in relation to a scintillator crystal and a collimator.
Figure 3:
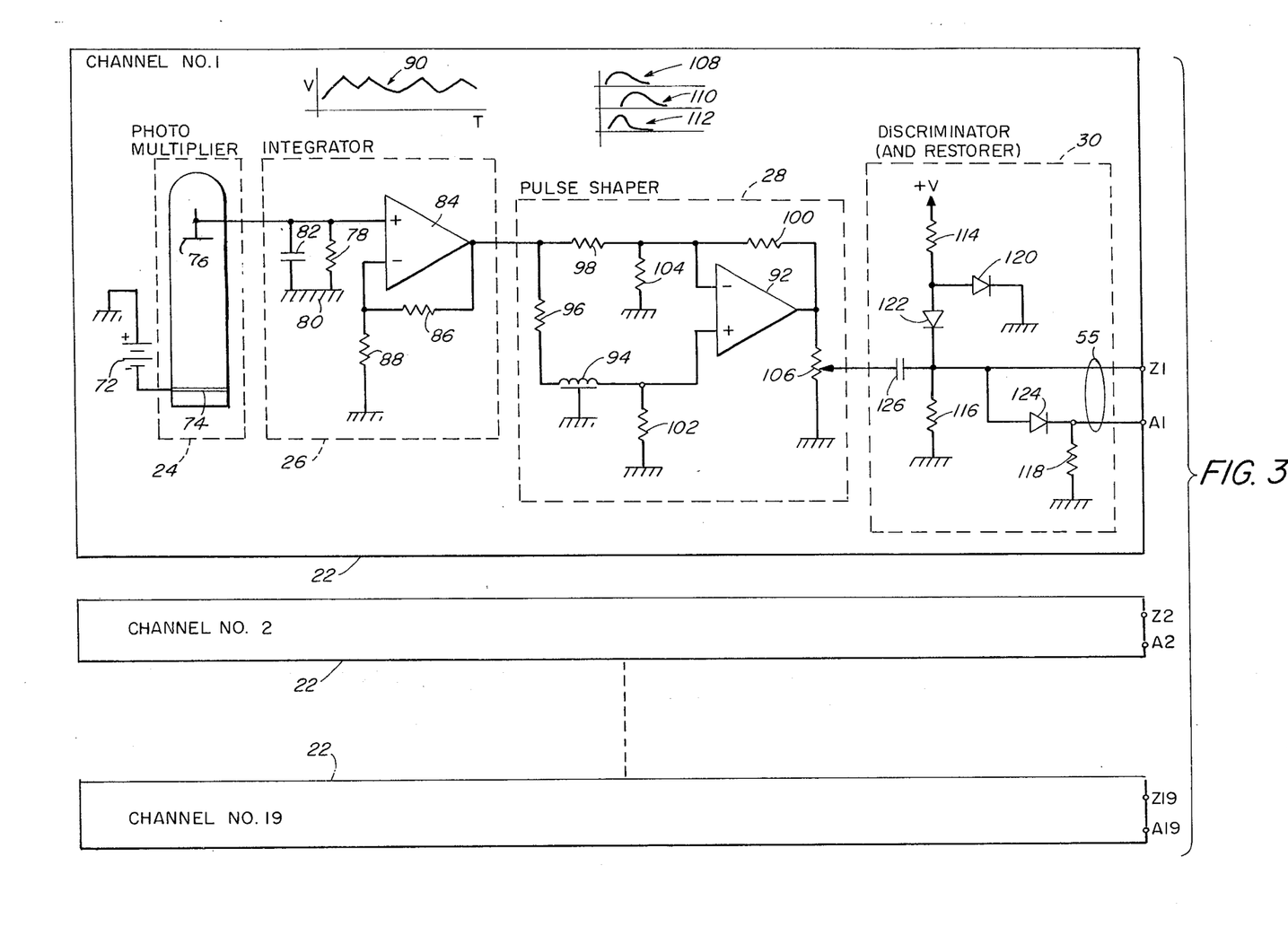
FIG. 3 is a schematic diagram of the electrical circuitry utilized in the integrator, the pulse shaping, and the discriminating and restoration circuitry referred to in FIG. 1.
Figure 4:
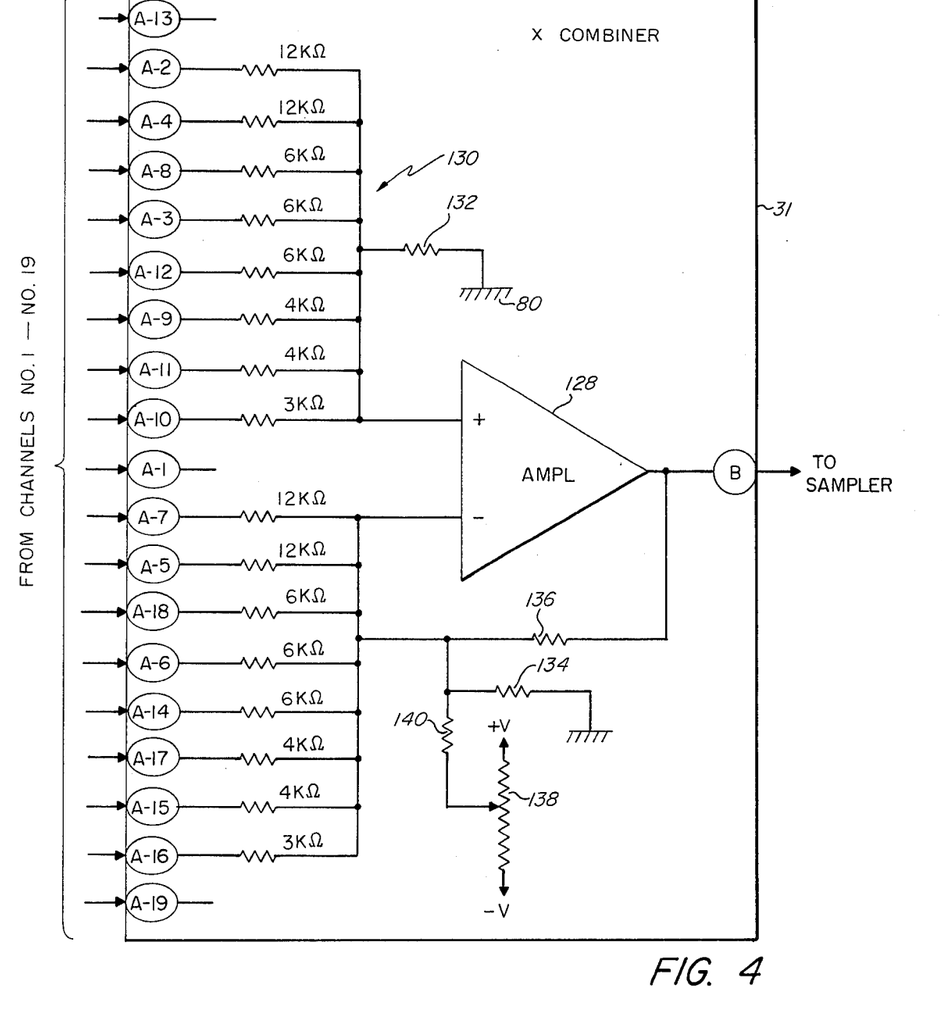
FIGS. 4 and 5 show, respectively, a circuit for combining the pulse signals and a table of resistor values for scaling these signals for the combiner circuits of FIG. 1.

Each of the discriminators 30 is coupled to each of the combiners 31-34 via lines 55 as shown in FIG. 1, with more precise details of the coupling to be seen in FIGS. 3 and 4 which show that each discriminator has a pair of outputs which are coupled in a prescribed manner to the respective combiners 31-34. The combiners 31-34, as will be seen in FIG. 4, are provided with scaling resistors for scaling the contributions of the discriminators 30 in accordance with the geometry of the photomultipliers 24, as will be seen in FIG. 2, to provide signals representing the X component and the Y component of the location of an impact of a gamma ray photon upon the scintillator crystal, the combiner 31 providing the X component and the combiner 32 providing the Y component. The combiner 33 provides a measure of the total energy recieved by all of the photomultipliers 24 which is used for scaling the X component and the Y component signals by a factor which compensates for irregularities in the scintillator crystal. The combiner 33 may be provided with variable scaling resistors which are useful for aligning the system 20 to minimize any distortion appearing in the image on the display 46.

The image on the display 46 is further enhanced by means of the combiner 34 and the analyzer 48, the combiner 34 functioning in a manner similar to that of the combiner 33 to provide a measure of the total energy received by the photomultipliers 24. The analyzer 48 is a well-known pulse height analyzer which provides the aforementioned signal on line 50 in response to signals from the combiner 34 only when the signals indicate that the energy of an impinging gamma ray photon is in excess of a preset minimum energy level and less than a preset maximum energy level, these energy levels being set by the knobs 56 and 58. The samplers 37-39 are triggered in response to the signal on line 50 and provide a sample of the voltages appearing at the outputs of the combiners 31-33, these samples having a duration sufficient to permit the multiplication operation of the scalers 42 and 44. Each of the scalers 42 and 44 are commercially available multiplying units such as that of "Intronics", Model No. 505; the scaler 42 multiplies the output of sampler 37 by the reciprocal of the output of the sampler 39, and the scaler 44 multiplies the output of the sampler 38 by the reciprocal of the output of the sampler 39. The values of the signals from the samplers 37-39 are equal to the values of the signals from the combiners 31-33 which are provided in accordance with the values of the scaling resistors as will be described with reference to FIG. 4.

Referring now to FIG. 2, there is shown an array of the photomultipliers 24 with individual ones of the photomultipliers 24 being numbered to identify their location in the array. The central photomultiplier 24 is numbered 1, the photomultipliers of the inner hexagon are numbered 2 through 7, and the photomultipliers of the outer hexagon are numbered 8 through 19. Also shown in FIG. 2 is a scintillator 60 in the form of a crystal of a material which emits light in response to excitation by high energy radiation, such a material being, for example, sodium iodide with thallium doping. The scintillator 60 is supported in relation to the photomultipliers 24 by means of a housing 62 and spaced from the front faces of the photomultipliers 24 by means of a light pipe 64 which is preferably of a material such as Lucite having a refractive index of approximately 1.5 to match the optical impedance of the scintillator 60 to the front faces of the photomultipliers 24. A collimator 66 having parallel passageways for conducting high energy photons to the scintillator 60 is positioned in front of the scintillator 60 by means of the housing 62 and oriented in the direction of a sourcse (not shown) of high energy radiation. High energy photons emitted from the source in the direction of the axis of the collimator 66 pass through the passages 68 to illuminate the scintillator 60 in a pattern corresponding to the form of the source. Photons incident upon the collimator 66 in a non-axial direction are substantially absorbed in the material, preferably lead, from which the collimator 66 is fabricated.

A reference frame 70 having an X coordinate axis and a Y coordinate axis may be positioned anywhere upon the array of photomultipliers 24 but is conveniently centered upon the array of photomultipliers 24 such that the Y axis passes through the photomultiplierse numbered 19, 1 and 13 while the X axis passes through the photomultipliers numbered 10, 3, 1, 6 and 16. With respect to the X axis combiner 31 of FIG. 1, the signals derived from the photomultipliers are suitably scaled or weighted in accordance with their respective distances from the Y axis. Similarly, with respect to the Y coordinate combiner 32 of FIG. 1, the signals derived from the photomultipliers 24 are suitably scaled or weighted in accordance with their respective distances from the X axis. These weightings will be described subsequently with reference to the table in FIG. 5. While various spacings between the scintillator 60 and the array of photomultipliers 24 may be utilized, it has been found that a spacing in the range of approximately one-half diameter to one diameter of a photomultiplier 24 is most advantageous for providing a sharp image on the display 46 of FIG. 1.

Referring now to FIG. 3, there is shown a schematic diagram of the circuitry in one of the channels 22 of FIG. 1, it being understood that the circuitry is the same in each of the channels 22. There are 19 of the channels corresponding to each of the 19 photomultipliers 24 of FIG. 2. Each channel 22 is seen to have a pair of outputs labeled with the letters A and Z, these terminals being further designated by the numerals 1-19 when it is desired to designate the terminals of a specific one of the channels 22. The terminals A are coupled to the combiners 31-32 in accordance with the interconnections to be seen in FIGS. 4 and 5 while the terminals Z are coupled to the combiners 33-34.

Each photomultiplier 24 is energized by a source of electrical power shown as a battery 72 and has its photoelectric electrode 74 being connected to the negative terminal of the battery 72 while the anode 76 of the photomultiplier 24 is connected via a resistor 78 and ground 80 to the positive terminal of the battery 72. A capacitor 82 is connected in parallel with the resistor 78.

The capacitor 82 serves as the integrating element in the integrator 26 with the resistor 78 providing a discharge path for charge stored within the capacitor 82. It is noted that by grounding the positive terminal of the battery 72 and coupling the integrating capacitor 82 and the resistor 78 between the anode 76 and ground, there is provided a substantial reduction in any noise voltage which might appear across the terminals of the capacitor 82. Due to the fact that the output impedance of the photomultiplier 24 is relatively high while the input impedance of the pulse shaper 28 is relatively low, an amplifier 84 with resistors 86 and 88 coupled thereto is connected between the capacitor 82 and the pulse shaper 28 for impedance matching purposes. A terminal of the capacitor 82 is connected to the plus input terminal of the amplifier 84 while the resistor 88 is coupled between the minus input terminal of the amplifier 84 and ground. Resistor 86 serves as a feedback path between the output of the amplifier 84 and its minus input terminal.

Typical voltage waveforms appearing across the terminals of the capacitor 82 as well as at the output of the amplifier 84 are shown in graph 90. The vertical axis labeled V represents the voltage while the horizontal axis labeled T represent time. It is seen that the voltage builds up repetitively at a rate depending on the rate of light flashes produced by the scintillator 60 and, between successive rises of the voltage is seen to discharge exponentially with a time constant given by the product of the capacitance of the capacitor 82 and the resistance of the resistor 78. In particular, it is noted that the shape of the waveform varies with a dependence on the interval between successive impacts of gamma ray photons upon the scintillator 60 of FIG. 2.

The pulse shaper 28 is seen to comprise an amplifier 92, a delay line 94 and resistors 96, 98, 100, 102 and 104, the latter resistor being variable. A potentiometer 106 is also provided for varying the magnitude of the voltage provided by the pulse shaper 28. Two branches are provided, the upper branch comprising resistors 98 and 104 and the lower branch comprising resistors 96, delay line 94 and resistor 102. In the upper branch, the signal is coupled via resistor 98 to the minus terminal of the amplifier 92, this signal being seen in graph 108. A signal coupled in the lower branch via the resistor 96 and the delay line 94 to the positive terminal of the amplifier 92 is seen in the graph 110. It is noted that the signal on graph 110 is delayed relative to the signal shown in graph 108, the delay being equal to the delay of the delay line 94. The difference between these two signals appears at the output of the amplifier 92 and is shown in graph 112. It is thus seen that the signal in the graph 112 is a pulse having a width much narrower than the discharge time of the capacitor 82 of the integrator 26. The resistor 100 serves as a feedback path between the output of the amplifier 92 and the minus terminal thereof, the variable resistor 104 in conjunction with the resistor 100 serving as a means for varying the gain of the pulse shaper as well as for balancing the magnitudes of the signals applied to the plus and minus terminals of the amplifier 92.

The discriminator 30 is seen to comprise resistors 114, 116 and 118, diodes 120, 122 and 124 and a capacitor 126. The discriminator 30 provides for a restoration of the base line of the pulse signal provided by the pulse shaper 28 by means of diode 122 and the diode 120 which serve to discharge the capacitor 126. During the application of positive voltages to the capacitor 126 by the pulse shaper 28, the diode 122 is open, however, any charge accumulated during this application of positive voltage is removed upon the occurrence of the trailing edge of the pulse of graph 112 at which time the diode 122 conducts. The junction of the diode 122 and 120 with the resistor 114 is maintained at a constant value of potential by virtue of current flowing through the resistor 114 from a positive source of voltage V and through the diode 120 to ground.

The amplitude discrimination is provided by the diode 124 in cooperation with the resistor 118. Pulses from the pulse shaper 28 of relatively small amplitude wherein the amplitude is less than the forward voltage drop of the diode 124 do not appear at terminal A. However, pulses from the pulse shaper 28 having a voltage amplitude greater than the forward voltage drop of the diode 124 cause the diode 124 to conduct whereupon the voltage is seen at terminal A. Thus the signals appearing at terminal A have been selected to be only those signals exceeding a threshold, this being the aforementioned forward voltage drop across the diode 124, while the signals appearing at terminal Z include also those signals having too small a value to pass through the diode 124.

While a battery 72 of fixed voltage is shown, it is advantageous to use a variable voltage source in which the voltage is adjusted to provide a predetermined value of signal in the output of the E combiner 34 when the photomultipliers 24 are activated in response to a specific isotope. This provides a normalization of the system 20 for specific isotopes so that the threshold of the discriminator 30 is always at optimal value. In addition, the multiplying factors in the scalers 42 and 44 vary within a predetermined range of magnitudes thereby permitting optimum operation of the scalers 42 and 44.

Figure 5:
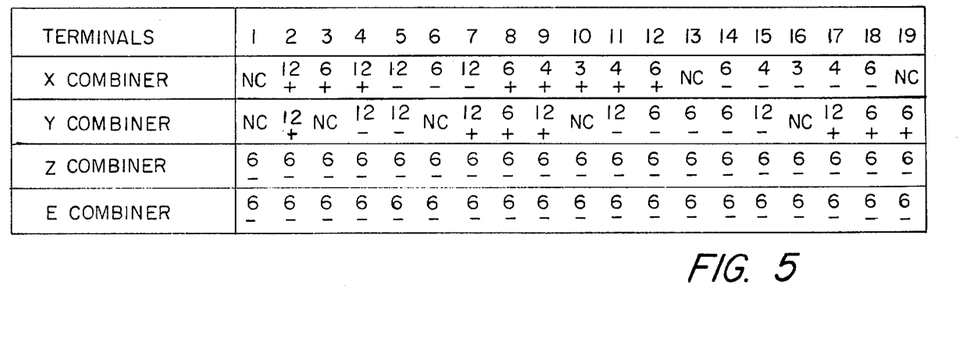

Referring now to FIGS. 4 and 5, there are shown respectively a block diagram of the combiner 31 of FIG. 1 and a table showing the values of the summing resistors which serve to scale or weight the signals from the channels 22, the table having four rows corresponding respectively to the resistor values of the combiners 31, 32, 33 and 34. The circuitry configurations for each of the four combiners 31–34 are identical; accordingly, only the circuit of the combiner 31 is shown in the figures. As has been mentioned hereinbefore, the X coordinate combiner 31 and the Y coordinate combiner 32 are each coupled to the terminals A1–A19 of the channels 22 while the Z combiner 33 and the E combiner 34 are each coupled to the terminals Z1–Z19 of the channels 22.

The combiner 31 is seen to comprise an amplifier 128, summing resistors 130, a resistor 132 coupling the plus terminal of the amplifier 128 to ground 80, a resistor 134 coupling the minus terminal of the amplifier 128 to ground, a feedback resistor 136 coupling the output terminal of the amplifier 128 to its minus input terminal for setting the gain of the amplifier 128, and a potentiometer 138 coupled between a positive and a negative source of voltage and coupled to the minus terminal of the amplifier 128 by a resistor 140 for providing an adjustable voltage offset. While there are 19 terminals, A1–A19, only 16 summing resistors 130 are provided for the combiner 31, there being no connection to the terminals A1, A13 and A19, this being indicated by the letters NC in the first row of FIG. 5. The reason for the lack of connection to the terminals A1, A13 and A19 is apparent from the arrangement of the photomultipliers 24 in FIG. 2 wherein it is seen that the correspondingly numbered photomultipliers 24 are located on the Y axis and, accordingly, get a zero weighting with respect to determining position in the direction of the X axis.

Referring to the second row of the table in FIG. 5, it is noticed that in the Y axis combiner 32, there is no connection provided by the signals of five of the photomultipliers 24 and their correspondingly numbered terminals, these being the terminals 1, 3, 6, 10 and 16, the lack of connection being shown in the second row of the table of FIG. 5, the lack of connection being due to the fact that, as is shown in FIG. 2, these five photomultipliers are located on the X axis and, therefore, make no contribution to displacements in the direction of the Y axis.

The values of the summing resistors 130 are in inverse relationship to the distances of the corresponding photomultipliers 24 from a coordinate axis of the reference frame 70 of FIG. 2. Thus, for example, the photomultipliers 24 numbered 2, 4, 5 and 7 are given a value of twelve kilohms in the X combiner 31 since their centers are spaced a half diameter from the Y axis. The photomultipliers 24 numbered 8, 3, 12, 14, 6 and 18 have corresponding resistance values of six kilohms in the X combiner 31 since these photomultipliers have their centers spaced one diameter from the Y axis. The photomultipliers 24 numbered 9, 11, 15 and 17 are provided with resistors having values of four kilohms in the X combiner 31 since these photomultipliers have their centers spaced one and one-half diameters from the Y axis. And, finally, the photomultipliers 10 and 16 have their corresponding resistors being valued at three kilohms in the X combiner 31 since these photomultipliers 24 have their centers spaced at a distance of two diameters of the Y axis. Similar comments apply to the resistors of the Y combiner 32 as shown in the second row of the table in FIG. 5 since the photomultipliers 24 numbered 17, 7, 2, 9, 11, 4, 5 and 15 are spaced at one-half the distance from the X axis of the photomultipliers 18, 19, 8, 12, 13 and 14.

With respect to the combiner 31 of FIG. 4, all of the summing resistors 130 corresponding to photomultipliers 24 of FIG. 2 are located to the right of the Y axis which are coupled to the plus input terminal of the amplifier 128 while the summing resistors corresponding to photomultipliers 24 located to the left of the Y axis are coupled to the minus input terminal of the amplifier 128. This is indicated in the first row of the table of FIG. 5 wherein plus signs are positioned beneath the resistance value for the resistors coupled to the terminals 2–4 and 8–12 while minus signs are positioned beneath the resistance values for the resistors coupled to the terminals 5–7 and 14–18. Similarly, in the second row of the table of FIG. 5, plus and minus signs are positioned beneath the resistance values indicate that the corresponding resistors are coupled to either of the plus or minus input terminals of the amplifier 128. With respect to the Z combiner 33 and the E combiner 34, all of these summing resistors 130 are coupled to the minus input terminal of the amplifier 128, the plus input terminal being grounded via resistor 132. Variable summing resistors may be utilized for the Z and E combiners 33 and 34, if desired, for more precise adjustment of the weightings accorded the signals from the various photomultipliers 24 to minimize the effects of barrel distortion and nonlinearities in the scintillator 60 to provide a more uniform image on the display 46 of FIG. 1. Also, the potentiometer 106 of FIG. 3 may be utilized in each channel 22 for adjusting its gain to eliminate the effects of barrel distortion from the image on the display 46.

It is understood that the above-described embodiment of the invention is illustrative only and that modifications thereof will occur to those skilled in the art. Accordingly, it is desired that this invention is not to be limited to the embodiment disclosed herein but is to be limited only as defined by the appended claims.

I claim:

1. A camera system comprising:
   an array of detectors of radiant energy positioned in a predetermined pattern for receiving such energy, each of said detectors providing a signal upon being illuminated with such energy;
   means coupled to each of said detectors for integrating successive ones of said detector signals;
   means coupled to said integrating means for delaying a signal of said integrating means;
   means coupled to said delay means and to said integrating means for forming the difference between a signal of said delay means and a signal of said integrating means, the delay of said delay means being of shorter duration than an integration time of said integrating means, said differencing means providing a pulse signal having an amplitude proportional to a signal of said integrating means; and
   means coupled to said differencing means for combining signals of said differencing means corresponding to individual ones of said detectors, said combining means including means for weighting signals of said differencing means in accordance with the positions of individual ones of said detectors in said array to provide the coordinate positions of points in an image, said weighting providing a scaling of individual ones of said detector signals inversely to the spacings between each of said detectors and a coordinate axis of said array.

2. A system according to claim 1 further comprising discriminating means coupled between said combining means and said differencing means for communicating only such ones of said pulses of said differencing means as exceeds a predetermined threshold.

3. A system according to claim 2 further comprising means coupled between said discriminating means and said differencing means for restoring a base line voltage to successive ones of said pulses of said differencing means.

4. A system according to claim 3 wherein said differencing means includes means for varying the amplitude of pulses provided by said differencing means.

5. A system according to claim 4 wherein said combining means includes a set of summing resistors for combining signals of said discriminating means corresponding to signals of said detectors in accordance with their relative positions from a coordinate axis of said array and a second set of summing resistors for combining signals of said discriminator means in accordance with the positions of said detectors relative to a second coordinate axis of said array.

6. A system according to claim 5 further comprising means responsive to signals of said restoring means for providing a gate signal, and sampling means responsive to said gate signal for sampling output signals of said combining means.

7. A system according to claim 6 further comprising means responsive to signals of said restoring means for combining said signals to provide a multiplier signal, and scaling means coupled to said sampling means for dividing sampled signals of said combining means by said multiplier signal.

* * * * *

UNITED STATES PATENT OFFICE
CERTIFICATE OF CORRECTION

Patent No. 3,914,611  Dated October 21, 1975

Inventor(s) Karl J. Stout

It is certified that error appears in the above-identified patent and that said Letters Patent are hereby corrected as shown below:

Col. 3, line 3: "voltagel" should be "voltage"

Col. 3, line 35: "recieved" should be "received"

Col. 4, line 24: "sourcse" should be "source"

Col. 4, line 38: "plierse" should be "pliers"

Col. 7, line 46: "diameters of" should be "diameters from"

Signed and Sealed this tenth Day of February 1976

[SEAL]

Attest:

RUTH C. MASON
Attesting Officer

C. MARSHALL DANN
Commissioner of Patents and Trademarks